United States Patent Office 3,551,094
Patented Dec. 29, 1970

3,551,094
PROCESS FOR PRODUCING NON-CAKING
CHLORINATED TRISODIUM PHOSPHATE
Charles S. King, Joliet, Ill., and Duane L. Sawhill,
Orange, Conn., assignors to Olin Corporation, a corporation of Virginia
No Drawing. Filed Nov. 28, 1967, Ser. No. 686,339
Int. Cl. C01d 11/00
U.S. Cl. 23—50
9 Claims

ABSTRACT OF THE DISCLOSURE

Chlorinated trisodium phosphate is rendered substantially non-caking by reacting it superficially with 0.05 to 0.5% by weight with a suitable gaseous acid, for example, $CO_2$, $SO_2$, $SO_3$, HCl or $H_2S$.

---

Chlorinated trisodium phosphate is a product widely used in automatic dishwashing compounds, household cleaners and general sanitizing formulations. A thorny problem historically associated with the processing and merchandising of this product has been its tendency to cake. One object of this invention is to provide an efficient, economical method to eliminate this caking.

Chlorinated trisodium phosphate is one of a series of double salts formed by trisodium phosphate and the sodium salts of certain monobasic acids. In this case, the other salt is sodium hypochlorite, NaOCl, and the generally accepted formula of the double salt is

$Na_3PO_4 \cdot \frac{1}{4} NaOCl \cdot 11H_2O$

It is commercially produced by pan crystallizing a mixture of concentrated $Na_3PO_4$ solution and sodium hypochlorite solution containing about 15% available chlorine. The bulk of the solution water is taken up as water of hydration in the finished product. The damp crystals are dried at low temperature with dehumidified air or in vacuum crystallizers.

The commercial product does not coincide exactly with the above formula shown for two reasons. The NaCl formed in the preparation of the NaOCl liquor:

$2NaOH + Cl_2 \rightarrow NaCl + NaOCl + H_2O$ is also present in the product. In addition, the starting $Na_3PO_4$ solution is adjusted to reduce the molar ratio of Na:P to slightly less than the 3.0 of $Na_3PO_4$, suitably about 2.9, to minimize the formation of the double salt $Na_3PO_4 \cdot \frac{1}{5} NaOH \cdot 12H_2O$. Commercial chlorinated trisodium phosphate usually contains at least 3.15% sodium hypochlorite (3.10% available chlorine and 91.75% sodium phosphate expressed as $Na_3PO_4 \cdot 12H_2O$ (17.15% $P_2O_5$). A typical analysis is 3.68% available chlorine and 18.0% $P_2O_5$ and the available chlorine content, basis $P_2O_5$, is 3.68/18.0 or 20.5%.

Processes useful for commercial preparation of chlorinated trisodium phosphate are described, for example, in U.S. Pats. 1,555,474; 1,965,304 and 1,988,991. U.S. Pat. 2,895,916 suggests addition of surfactants, sodium silicate and sodium tripolyphosphate to chlorinated trisodium to reduce caking tendencies.

Several factors have been determined to affect the caking tendency in this material:

(1) Crystal size and shape—Smaller crystals increase the caking tendency. A product containing finer crystals, for example, 50 to 60% through 200 mesh, presents much more severe caking problems than a product containing coarser crystals.

(2) Elevated storage temperatures—At elevated temperatures, the greater water vapor pressure over the chlorinated trisodium phosphate causes moisture to evaporate and condense on the crystal surfaces, solubilizing some of the phosphate and resulting in bridging between crystals. This builds a firm cake. Storage at moderate temperatures helps to reduce caking in this product.

(3) Excessive moisture—Under-dried chlorinated trisodium phosphate is tacky and sticky. The caking tendency of such a product is considerably worse than in thoroughly vacuum dried product.

(4) Excessive storage pressure—Pressure accentuates caking. High stacking of bags in storage promotes caking, particularly in the bottom bags and, so far as stacking can be avoided, the caking problem is ameliorated.

(5) Age or curing time—Flowability improves after an initial set if the product is pulverized or broken up. After the freshly prepared chlorinated trisodium phosphate is aged 16 to 24 hours it seems to attain equilibrium and then is less susceptible to caking.

(6) Crystal surface composition—The crystal surface composition is a most important factor in chlorinated trisodium phosphate caking. When freshly prepared chlorinated trisodium phosphate crystals are washed, the crystal surfaces are removed and analysis shows that the crystal surfaces contain 25 to 50% more available chlorine than the composition as a whole. It appears that the crystal surfaces contain uncombined sodium hypochlorite which is very hygroscopic and which is responsible to a large degree for the caking. Variations in crystallization procedure failed to modify or improve the caking tendency.

No satisfactory quantitative measure of caking tendency is available. For the purposes of this invention, the number of times a one-pound bottle half-filled with chlorinated trisodium phosphate had to be tapped on the heel of the hand is taken as a measure of the caking tendency. All samples of chlorinated trisodium phosphate irrespective of previous history taken an initial "set" but there are large differences in the hardness of the "set." A sample treated with a gaseous acid plus a surfactant and allowed to "set" for 16 hours flows freely with one very light tap on the heel of the hand. Treatment with gaseous acid alone typically requires one or two sharp blows on the heel of the hand to cause the material to flow freely. Surfactant treated material typically requires two to four sharp blows to cause it to flow freely. An untreated sample of chlorinated trisodium phosphate typically requires six to eight (or more) sharp blows of the inverted bottle on the heel of the hand before the product flows freely. The gaseous acid treated product remains free flowing thereafter. The untreated product continues to take a "set" each time it remains static for a few hours.

According to the process of this invention, chlorinated trisodium phosphate is reacted with a gaseous acid. The resulting product has a greatly increased resistance to caking in storage and use. It is much more readily acceptable by the customer; it enjoys increased sales and even commands a premium in the market.

By "gaseous acid" in the present specification and claims is meant a gaseous acid having in water a dissociation constant greater than $3.2 \times 10^{-8}$ which is the dissociation constant of hypochlorous acid. Such gaseous acids are strong enough to decompose hypochlorous acid to form chloride and/or chlorate. In addition, the term "gaseous acid" is meant to include gaseous acid halides and gaseous acid anhydrides which react with water to form acids having dissociation constants as defined above.

While this invention is not limited by any theoretical explanation of the causes of caking of chlorinated trisodium phosphate or the reasons for the effectiveness of the process of this invention, the process of this invention is believed to reduce and substantially eliminate the caking tendencies of chlorinated trisodium phosphate by destroying excess sodium hypochlorite on the crystal surfaces. This is accomplished by treating the crystals with the proper amount of gaseous acid while they were being mixed or tumbled. The hypochlorite is thereby converted to chloride and/or chlorate. Analysis of the free flowing crystals after treatment verified the destruction of the excess hypochlorite on the crystal surfaces and showed 20 to 21% available chlorine on a $P_2O_5$ basis, substantially that of the whole composition.

Examples of gaseous acids effective in the process of the present invention are $CO_2$, $SO_2$, $SO_3$, HCl, $H_2S$, HF, $SiF_4$, $BF_3$, $BCl_3$, $PF_3$, NO, $NO_2$ and other gaseous acids at concentration levels of 0.05 to 0.5% by weight. Amounts greater than this do not further reduce the caking tendencies of chlorinated trisodium phosphate and tend to destroy excessive amounts of available chlorine. Optimum treatment levels are preferably from about 0.1 to 0.25% and especially 0.15 to 0.20% by weight. $CO_2$ is especially preferred as the gaseous acid for both efficacy and low cost, particularly when used at 0.2% by weight treatment level. The gas treatment resulted in a small but acceptable loss of available chlorine in the product. A typical loss, using 0.20% $CO_2$, was about 0.07%; i.e., a product containing 3.07% available chlorine analyzed 3.63% following treatment. Shelf life of the treated product is not reduced by the process of this invention. $CO_2$ treatment is preferred because of lower cost of the gas and absence of toxicity.

Treatment with $SO_2$ and $H_2S$ required smaller quantities because they are both acid and reducing gases. Somewhat less than 0.2% by weight of $SO_2$ was effective, suitably about 0.1 to 0.15%.

Gases are advantageous over solids or liquids for use in this invention. They distribute themselves uniformly over the crystal surfaces with a minimum of additive. Gases are conveniently added to the product in any of its processing stages where it is under agitation. This eliminates the need for special mixing or blending devices required for solid or liquid anti-caking agents. The addition of gaseous acid to chlorinated trisodium phosphate releases water of crystallization from the product. Therefore, the most desirable time to treat the chlorinated trisodium phosphate is before or during the drying process to facilitate removal of the released moisture.

The gaseous acids are measured in any suitable manner, by volume or weight, into the batch of damp chlorinated trisodium phosphate or both are mixed in continuous flow. Gaseous carbon dioxide is also suitably introduced by vaporizing solid carbon dioxide. When convenient, the gaseous acids are used in mixtures of two or more of the gaseous acids or diluted with inactive gases. It is preferred to use mixtures containing at least 50 percent of gaseous acids to minimize reaction time and to utilize fully the capacity of the equipment.

Surprisingly, combining the gaseous acid treatment with surfactant treatment shows a synergistic effect. A more free flowing chlorinated trisodium phosphate was produced than would have been predicted from the benefits derived from the two treatments separately. Curing time was also reduced. Surfactants found especially effective were alkyl aryl sulfonates, for example, dodecyl benzene sulfonate (Ultrawet) and methylnaphthalene sulfonate (Petro-Ag-Special). They were effective at a concentration of 0.05% by weight and showed no deleterious effect on the chlorine stability of the product. More than 0.1% resulted in little additional improvement in caking tendency and induced some chlorine instability in the product. At least about 0.01% by weight of the surfactant is desirable to produce the synergistic effect. The gaseous acid treatment is thus compatible with and greatly enhances the surfactant treatment of chlorinated trisodium phosphate.

The improvement in flowability is further greatly improved by aging at room temperature in a closed container. After 16 hours, the product takes a set which is broken easily and the product is then free flowing and remains so during storage.

EXAMPLE I (1) Preparation of trisodium phosphate liquor.—407 grams of technical disodium phosphate ($Na_2HPO_4$) were dissolved in 675 ml. of 3.816 N NaOH solution. The resulting solution was evaporated to a volume of 400 ml. and a concentration of 56.0° Bé. at 100° C.

(2) Preparation of sodium hypochlorite solution.—Gaseous chlorine was passed in 15 ml. of NaOH solution (258 g. NaOH/liter) contained in a two liter, 3 neck flask. The flask and contents were immersed in an ice bath and maintained at a temperature below 15° C. throughout the chlorination. Agitation was provided. A steady chlorine addition rate of 3.45 grams/minute was maintained until the NaOCl solution analyzed 184 grams available chlorine per liter and 11 grams excess NaOH per liter. The finished product was stored in a refrigerated, black coated polyethylene bottle until used.

(3) Crystallization.—The hot, 56° Bé. trisodium phosphate liquor was transferred to the preheated bowl of a household mixer fitted with a plywood cover and insulated with pulp asbestos to minimize heat loss. When the solution temperature dropped to 72° C., 300 ml. of the NaOCl solution prepared above were added. Crystallization of the chlorinated trisodium phosphate started almost immediately. The temperature held at 62° C., the melting point of chlorinated trisodium phosphate, for 30 to 40 minutes. The mass was continuously stirred until it cooled to room temperature. Weight of the damp chlorinated trisodium phosphate was 1175 grams.

(4) Drying.—The damp chlorinated trisodium phosphate was vacuum dried in approximately 300 gram portions at 17 mm. Hg. pressure and at a temperature of 30 to 32° C. About 10 minutes additional drying time was provided after the product appeared dry and free flowing. Drying time was 60 to 80 minutes for a 300 gram charge.

(5) Application of $CO_2$.—$CO_2$ was added to chlorinated trisodium phosphate near the end of the drying process after the product became free flowing. A chip of Dry Ice was sublimed to the desired weight in air and then into the product flask. Sublimation was complete in about 5 minutes and then the drying was completed in vacuum.

(6) Evaluation of caking tendencies.—The caking tendency of chlorinated trisodium phosphate was determined by placing 300 grams of finished chlorinated trisodium phosphate in a one pound, screw cap bottle. The bottle and contents were tapped ten times on the table top to settle and compact the product in the bottle. After standing 16 hours or more, the bottle was overturned and the caking estimated on the basis of how freely the product fell from one end of bottle to other, or how much shaking and tapping was required to make it flow. The $CO_2$-treated material was free flowing after two light taps on the heel of the hand while the untreated chlorinated trisodium phosphate required 8 sharp taps to render it free flowing. The $CO_2$-treated material remained free flowing for at least several days but the untreated material "set" again after 16 quiescent hours and again required at least 8 sharp taps to render it free flowing.

EXAMPLE II

Chlorinated trisodium phosphate was prepared and crystallized as described in paragraphs (1), (2) and (3) of Example I. $SO_2$ was reacted with the chlorinated trisodium phosphate by weighing the $SO_2$ gas into an evacuated flask and transferring the $SO_2$ into an evacuated flask containing the damp chlroinated trisodium phosphate. Drying was then completed in vacuum as described in paragraph (4) of Example I.

Caking tests were run on the treated and untreated materials as described in Example I with substantially the same improvement in caking characteristics.

EXAMPLE III

Chlorinated trisodium phosphate was prepared by mixing trisodium phosphate liquor and sodium hypochlorite solution as described in Example I. As crystallization was beginning, 0.565 grams of dry Ultrawet K, an alkyl aryl sulfonate surfactant, was added to the crystallizing mass. This addition amounted to 0.05% of the ultimate dry weight of the chlorinated trisodium phosphate (1130 g.). The crystallization and drying was completed as described in Example I. Only one light tap of the aged material was required to render it free flowing and it then remained free flowing without taking a later set during further storage.

EXAMPLE IV

The procedure of Example III was repeated substituting Petro-Ag-Special, a commercial methylnaphthalene sulfonate surfactant for the Ultrawet K with essentially the same results.

EXAMPLE V

Chlorinated trisodium phosphate was prepared by mixing trisodium phosphate liquor and sodium hypochlorite solution as described in Example I. As crystallization was beginning 0.565 gram of Ultrawet K, dissolved in about 5 to 6 ml. of water was added dropwise to the mixing, crystallizing mass. This addition amounted to 0.05% of the ultimate dry weight of the chlorinated trisodium phosphate (1130 g.). The crystallization and drying was completed as described in Example I. Only one light tap of the aged material was required to render it free flowing and it then remained free flowing without taking a later set during further storage.

EXAMPLE VI

The procedure of Example V was repeated substituting Petro-Ag-Special, a commercial methylnaphthalene sulfonate surfactant for the Ultrawet K with essentially the same results.

EXAMPLES VII–XVI

Essentially the same results were obtained when the procedure of Example I was repeated substituting for $CO_2$ the following gaseous acids:

| Example: | Gaseous acid |
|---|---|
| VII | $SO_3$ |
| VIII | HCl |
| IX | HF |
| X | $H_2S$ |
| XI | $SiF_4$ |
| XII | $BF_3$ |
| XIII | $BCl_3$ |
| XIV | $PF_3$ |
| XV | NO |
| XVI | $NO_2$ |

What is claimed is:

1. The method of producing a particulate, substantially non-caking chlorinated trisodium phosphate composition which comprises reacting the crystal surfaces of a body of particulate chlorinated trisodium phosphate with from about 0.05 to 0.5 percent by weight of gaseous acid based on the total weight of said body of chlorinated trisodium phosphate, the concentration of said gaseous acid being at least 50 percent, said gaseous acid having in water a dissociation constant greater than $3.2 \times 10^{-8}$, and drying the resulting composition.

2. The method as claimed in claim 1 in which said gaseous acid is reacted with said chlorinated trisodium phosphate prior to final drying of the resulting composition.

3. The method as claimed in claim 1 in which said gaseous acid is carbon dioxide.

4. The method as claimed in claim 1 in which said gaseous acid is sulfur dioxide.

5. The method as claimed in claim 1 in which said gaseous acid is hydrogen chloride.

6. The method as claimed in claim 1 in which said gaseous acid is hydrogen sulfide.

7. The method as claimed in claim 1 in which said gaseous acid is sulfur trioxide.

8. The method as claimed in claim 1 in which from 0.01 to 0.1 percent by weight of alkyl aryl sulfonate surfactant is admixed with said chlorinated trisodium phosphate prior to drying.

9. The method as claimed in claim 1 in which said chlorinated trisodium phosphate is reacted with said gaseous acid during drying at subatmospheric pressure and at a temperature below 40° C.

References Cited

UNITED STATES PATENTS

| 1,894,149 | 1/1933 | Bartling | 252—385X |
| 2,032,173 | 2/1936 | Johnson et al. | 23—50X |
| 2,536,456 | 1/1951 | Miller | 23—86 |
| 3,306,858 | 2/1967 | Oberle | 252—385X |

FOREIGN PATENTS

| 1,004,148 | 3/1957 | Germany | 23—50 |
| 1,129,136 | 5/1962 | Germany | 23—50 |

HERBERT T. CARTER, Primary Examiner

U.S. Cl. X.R.

23—293